United States Patent [19]

Liman et al.

[11] Patent Number: 5,445,879
[45] Date of Patent: Aug. 29, 1995

[54] PROCESS FOR THE PREPARATION OF COMPOSITE BODIES

[75] Inventors: Ulrich Liman, Langenfeld; Dirk Wegener, Monheim; Hartwig Grammes, Leverkusen, all of Germany

[73] Assignee: Bayer Aktiengesellschaft, Leverkusen, Germany

[21] Appl. No.: 347,442

[22] PCT Filed: May 26, 1993

[86] PCT No.: PCT/EP93/01325

§ 371 Date: Dec. 1, 1994

§ 102(e) Date: Dec. 1, 1994

[87] PCT Pub. No.: WO93/25597

PCT Pub. Date: Dec. 23, 1993

[30] Foreign Application Priority Data

Jun. 9, 1992 [DE] Germany .................. 42 18 840.7

[51] Int. Cl.[6] .................................................. B32B 3/26
[52] U.S. Cl. ..................... 428/304.4; 428/319.3; 521/117; 521/125
[58] Field of Search .................. 428/304.4, 319.3; 521/117, 125

[56] References Cited

U.S. PATENT DOCUMENTS 4,336,341 6/1982 Fujiwara et al. ................. 521/109
4,868,043 9/1989 Eling et al. ....................... 428/304.4

*Primary Examiner*—Morton Foelak
*Attorney, Agent, or Firm*—Joseph C. Gil

[57] ABSTRACT

The present invention is directed to an improved process for the preparation of composite bodies by back-foaming plastics sheets with a polyurethane reaction mixture. The improvement is in using certain hydroxycarboxylic acids present in the alkali salt form as the catalyst.

5 Claims, No Drawings

PROCESS FOR THE PREPARATION OF COMPOSITE BODIES

This invention relates to a novel process for the preparation of composite bodies by back-foaming plastics sheets with a reaction mixture which reacts fully to a soft or semi-rigid polyurethane foam and which contains as catalysts certain hydroxycarboxylic acids present in the alkali salt form, and the composite bodies obtained by said process.

Sheet composite bodies prepared by back-foaming a plastics sheet with a reaction mixture which reacts fully to a soft or semi-rigid polyurethane foam are very important industrially, being very widely used, for example, for motor vehicle and aircraft interiors or in the manufacture of upholstered furniture. It is essential for the majority of these fields of application for the foams to exhibit, in addition to good mechanical properties (in particular excellent tear resistance), good heat resistance and a low "fogging" tendency. In particular, the fogging behaviour (tendency towards dissociation of low-volatile compounds which become deposited on cool surfaces such as car windows) displayed by the known back-charge foams is a problem in respect of which an improvement would be worthwhile.

Tertiary amines, which are frequently utilised as catalysts, are an example of components which lead to fogging when used in the reaction mixture which reacts fully to form polyurethane foam. Attempts have therefore already been made to replace these amines with, for example, alkali metal salts of carboxylic acids, such as potassium acetate. However, catalysis alone using such catalysts is associated with the disadvantage of excessive mould removal time or (if catalyst concentration is increased) excessively short initiation times. Admittedly, when organic tin compounds are used an improvement is generally obtained in the fogging behaviour, but problems then arise as regards the constancy of activation of the polyol component over a protracted storage period, because of the presence of the hydrolytically labile organic tin compounds in the water-containing polyol.

U.S. Pat. No. 4,868,043 recommends using as catalysts semi-esters of (i) intramolecular carboxylic acid anhydrides and (ii) long-chain diols, such semi-esters being present in the alkali salt form, but because these compounds are monofunctional in the sense of the isocyanate addition reaction, the inevitable result is chain-breaking reactions, and hence reduced tear resistance in the foam.

It has now surprisingly been found that an optimum solution to the problems which are addressed is obtainable by using the catalysts which are essential to the invention, which are described below in greater detail. The essential point of the process according to the invention which is described in greater detail below comprises using as catalysts reaction products, present in the alkali salt form, of at least trivalent alcohols and intramolecular carboxylic acid anhydrides, wherein the reaction products must exhibit as a statistical average per molecule at least 2 hydroxyl groups and at least 0.5 alkali carboxylate groups. Virtually no chain-breaking reactions occur because at least bifunctional compounds are used. A further advantage of the incorporatable catalysts essential to the invention, in addition to the excellent fogging behaviour which can be achieved, resides in the possibility afforded by the reaction mixtures according to the invention of comparatively long initiation times, while short mould removal times remain unchanged.

The object of the invention is a process for the preparation of composite bodies by back-foaming a plastics sheet constituting the top layer with a reaction mixture which reacts fully to a soft or semi-rigid polyurethane foam, the mixture substantially comprising
 a) a polyisocyanate component,
 b) a polyol component free of salt groups,
 c) at least one blowing agent,
 d) alkali salts of hydroxycarboxylic acids as catalysts, and optionally
 e) further auxiliary substances and additives taken from polyurethane chemistry,
characterised in that a quantity of from 0.5 to 1.0 wt-%, calculated on the weight of component b), of reaction products, present in the alkali salt form, of (i) at least trivalent alcohols within the molecular weight range 92 to 10,000 and (ii) intramolecular carboxylic acid anhydrides, is used as component d), the said reaction products exhibiting as a statistical average per molecule at least 2 alcoholic hydroxyl groups and at least 0.5 alkali carboxylate groups.

A further object of the invention is the composite bodies obtained in accordance with this process.

The polyisocyanate component a) to be utilised in the process according to the invention is constituted by any diisocyanates or polyisocyanates, in particular those having aromatically bonded isocyanate groups. 2,4-diisocyanatotoluene, its industrial mixtures with 2,6-diisocyanatotoluene (TDI), and in particular polyisocyanate mixtures of the diphenylmethane series (MDI) which are liquid at room temperature, are preferably utilised. Polyisocyanate mixtures such as are obtained by reacting aniline formaldehyde condensates with phosgene, or distillation fractions or distillation residues prepared from such phosgenation products, or modification products of such polyisocyanates exhibiting urethane groups, carbodiimide groups and/or uretdione groups, or polyisocyanate mixtures of the diphenylmethane series, are of particular interest in this context. The preferred, optionally chemically modified, polyisocyanate mixtures of the diphenylmethane series generally exhibit an NCO content of approximately 25 to 33 wt-%.

Component b) is constituted in particular by polyether polyols or mixtures of polyether polyols having an (average) molecular weight of from 400 to 12,000, and preferably from 2,000 to 6,000, calculatable from hydroxyl group content and hydroxyl functionality, and an (average) hydroxyl functionality of from 2 to 8, and preferably from 2 to 4, or mixtures of such polyether polyols with multivalent alcohols of a molecular weight below 400 which may optionally be co-utilised in a quantity of up to 10 wt-%, calculated on the weight of the polyether polyols.

The polyether polyols which are contemplated are those of the type which is known per se, such as may be obtained by alkoxylation of suitable starter molecules in a manner which is known per se. Suitable starter molecules are for example, ethylene glycol, propylene glycol, trimethylolpropane, glycerol, sorbitol, pentaerythritol or saccharose or any mixtures of such multivalent alcohols. Utilisation of polyether polyols obtained by alkoxylation of trifunctional starter molecules, in particular of trimethylolpropane and/or glycerol, is most particularly preferred. The alkylene oxides which are utilised in the alkoxylation reaction are constituted in particular by propylene oxide or ethylene oxide or mixtures of these two alkylene oxides. The alkylene oxides named may also be utilised consecutively in the alkoxylation reaction.

Further polyols which are in principle suitable and which may be utilised as component b) are for example described in EP-A 0 380 993.

Component c) is preferably constituted by water. Halogenated hydrocarbons such as trifluorochloromethane, fluoridated hydrocarbons, highly volatile organic solvents, such as pentane, acetone or diethylether may, for example, also be utilised as blowing agent in addition to water. The co-utilisation of such blowing agents in addition to water is, however, less preferred.

The catalysts d) which are essential to the invention are constituted by reaction products, present in the alkali salt form, of (i) tri- or higher functional alcohols within the molecular weight range 92 to 1,000 with (ii) intramolecular carboxylic acid anhydrides. The reaction products exhibit (as a statistical average) at least 2, and preferably from 2 to 5, hydroxyl groups and at least 0.5, and preferably from 1.0 to 4, carboxylate groups, alkali cations representing the counter ions to the carboxylate groups. The "reaction products" of the starting components (i) and (ii) may also, as is evident from the carboxylate group content, be mixtures of actual reaction products with excess quantities of alcohols (i).

Suitable multivalent alcohols for the preparation of the reaction products are, for example, glycerol, trimethylolpropane, sorbitol, pentaerythritol, mixtures of such multivalent alcohols, alkoxylation products in the aforementioned molecular weight range of such multivalent alcohols or of mixtures of such alcohols, wherein alkoxylation utilises propylene oxide and/or ethylene oxide in any sequence or in mixture, but preferably exclusively propylene oxide.

Suitable intramolecular carboxylic acid anhydrides for the preparation of the reaction products are for example maleic anhydride, phthalic anhydride, hexahydrophthalic anhydride, succinic anhydride, pyromellitic anhydride or any mixtures of such anhydrides. Maleic anhydride is utilised particularly preferably.

The reaction between anhydride and multivalent alcohol takes place in a manner which is known per se, generally in substance within the temperature range 20° to 100° C., until the theoretically expected acid number is reached in the reaction product. Hydroxides, carbonates or bicarbonates of sodium or potassium are preferably utilised to convert the carboxyl groups formed into carboxylate groups, wherein these bases are preferably utilised in the form of aqueous solutions, so that mixtures of catalyst according to the invention d) and blowing agent c) are directly produced which may then be mixed with the remaining components b) to e).

If greater quantities of water are required to prepare the alkali salts than are required subsequently as blowing agent, the unwanted surplus may naturally be removed by distillation before performing the process according to the invention.

The catalysts which are essential to the invention d) are utilised in performance of the process according to the invention in a quantity of from 0.5 to 10, and preferably from 1.0 to 10 wt-%, calculated on the weight of component b).

The reaction mixture may also, in addition to the catalysts essential to the invention, contain other catalysts which are known per se, although this is less preferred. Such catalysts are for example any alkali salts of carboxylic acids not corresponding to the definition of component d), such as potassium acetate, potassium tartrate or potassium succinate or classic catalysts such as triethylenediamine, bis-(2-dimethylaminoethyl) ether, N,N-dimethylethanolamine, N,N,N',N'',N''-pentamethyldiethylenetriamine, N-methylmorpholine, dimethylbenzylamine, tertiary alkyl phosphines, tin(II) octoate, dibutyltin-(IV) dilaurate, and chelates of metals, such as chelates of the acetylacetonate of magnesium, zirconium or nickel. These catalysts which are optionally co-utilised, which should be allocated to group e) of starting materials according to the invention, are at all events utilised in quantities of a maximum of 1.0 wt-%, calculated on the weight of component b), if at all.

Further auxiliary substances e) to be optionally co-utilised are the conventional additives such as flameproofing agents, fillers, pigments, plasticisers, antistatic agents or cell regulating agents.

In performing the process according to the invention, the starting materials cited are brought to reaction together in quantitative ratios such as correspond to an NCO index (number of NCO groups divided by the number of groups capable of reacting with NCO groups, and multiplied by 100) of from 70 to 120. The components b) to e) are generally mixed to form a "polyol component", which is then brought to reaction with the polyisocyanate component in accordance with the conventional polyurethane foam preparation methods.

A plastics sheet is "back-foamed" during performance of the process according to the invention. Plastics sheets which are suitable for this purpose are all types of top layers which have hitherto been prepared in the preparation of sheet composites by back-foaming plastics sheets with polyurethane foams. Examples which may be cited are sheets of polyvinyl chloride (PVC), thermoplastic polyurethane, polymer blends of PVC and ABS or thermoplastic polyolefines.

The process according to the invention is preferably performed in such a manner that the internal walls of a mould are lined at least partially with the plastics sheet to be back-foamed, and the moulding tool is then charged with the foamable mixture. The sheets used for internal lining of the moulds may be preformed in a manner which is known per se, wherein the known deep-drawing or "powder flush" techniques are used. The quantity of foamable mixture introduced into the mould is generally measured in such a manner that foams having an apparent density of from 30 to 500, and preferably from 70 to 200, kg/m$^3$ result.

The Examples which follow serve to explain further the process according to the invention.

EXAMPLES

1. Preparation of a Catalyst to be Used According to the Invention 9.8 g (0.1 mol) of maleic anhydride are stirred at 50° C. with 30.6 g (0.1 mol) of a polyether polyol of molecular weight 306, prepared by ethoxylation of trimethylolpropane, until the anhydride is dissolved. The reaction is interrupted when an acid number of 135 mg KOH/g is reached. The semi-ester thus prepared is converted to the corresponding alkali salt in the next stage of the reaction.

2. Preparation of a Polyol Formulation According to the Invention 100 parts by weight of a polyether polyol having an OH number of 28 and prepared by propoxylation of trimethylolpropane and subsequent ethoxylation of the propoxylation product (weight ratio of PO:EO=85:15) are mixed with 3 parts by weight of the semi-ester described under 1). This mixture is then mixed with 0.42 parts by weight of potassium hydroxide dissolved in 2.4 parts by weight of water.

3. Polyisocyanate Component

A polyisocyanate mixture of the diphenylmethane series having a viscosity at 23° C. of 200 mPa.s and an NCO content of 32 wt-% was used in the following Examples.

4. Examples According to the Invention and Comparative Examples

The foams are prepared by the hand foaming method. For this all components, with the exception of the polyisocyanate component, are pre-stirred for 30 sec (stirring rate: 1000 rpm). The polyisocyanate component is then added and stirring continues for a further 10 sec at room temperature. The NCO index in all Examples is 100.

The liquid foamable mixture is then introduced into a 20×20×2 cm slab-producing tool, the internal walls of which have previously been lined with a 1 mm-thick soft PVC sheet. The quantity of foamable mixture is in each case measured in such a way that the apparent density of the resulting foam is 150 kg/m$^3$.

The initiation, rise and setting times were determined in parallel tests, the polyol formulation being combined with the polyisocyanate component, as described, in a glass beaker with stirring at room temperature. The initiation time is then the time which elapses from the time of polyisocyanate addition to commencement of foaming; the rise time is the time which elapses from polyisocyanate addition until termination of foaming; the setting time is the time which elapses from polyisocyanate addition until the foam ceases to be tacky.

The tear propagation resistance was tested on the foam core of the slab produced, in accordance with DIN 53575. The fogging behaviour was in each case tested on 8 cm-diameter, 2 mm-thick foam test discs. The test bodies were in each case heated to 100° C. under a cooled glass disc for 16 hours and the condensate which formed on the cooled glass disc weighed.

Details are shown in the Table below.

Example A is according to the invention, using the above-mentioned starting materials.

Example B is a Comparative Example corresponding to the Example A according to the invention except that the catalyst according to the invention (comprising the semi-ester according to 1) and the potassium hydroxide used to neutralise it in 2)) has been replaced by 0.3 parts by weight of potassium acetate.

Example C is a Comparative Example corresponding to the Example according to the invention, except that the catalyst according to the invention has been replaced by 0.76 parts by weight of permethylated diethylenetriamine.

Example D is a Comparative Example corresponding to the Example according to the invention, except that the catalyst according to the invention has been replaced by 4 parts by weight of the reaction product of equimolar quantities of polyethylene glycol of molecular weight 600 and maleic anhydride, neutralised with a stoichiometric quantity of potassium hydroxide.

The catalyst concentrations were in all Examples selected in such a manner that approximately identical rise times result.

TABLE

| Example | A | B | C | D |
|---|---|---|---|---|
| Initiation time (s) | 26 | 12 | 14 | 22 |
| Rise time (s) | 102 | 100 | 100 | 105 |
| Setting time (s) | 110 | 130 | 100 | 120 |
| Tear propagation resistance (N/mm) | 1.2 | 0.4 | 0.6 | 0.4 |
| Fogging behaviour (mg) | 0.4 | 0.6 | 1.7 | 0.4 |

We claim:

1. In the process for the preparation of composite bodies by back-foaming a plastics sheet as top layer with a reaction mixture which reacts fully to a soft or semi-rigid polyurethane foam, wherein said reaction mixture comprises
   a) a polyisocyanate component,
   b) a polyol component free of salt groups,
   c) at least one blowing agent,
   d) alkali salts of hydroxycarboxylic acids as catalysts, and optionally
   e) further auxiliary substances and additives taken from polyurethane chemistry, the improvement wherein component d) is an alkali metal salt of a reaction product of (i) at least trivalent alcohols having molecular weights of from 92 to 1,000 and (ii) intramolecular carboxylic acid anhydrides, wherein said reaction products contain a statistical average per molecule at least 2 alcoholic hydroxyl groups and at least 0.5 alkali carboxylate groups, and wherein said component d) is present in a quantity of from 0.1 to 10 wt-%, bound on the weight of component b).

2. The process of claim 1, wherein polyisocyanate mixtures of the diphenylmethane series, which are liquid at room temperature and optionally exhibit urethane, carbodiimide and/or uretdione groups, are used as component a).

3. The process of claim 1 wherein polyether polyols or mixtures of polyether polyols of an (average) hydroxyl functionality of from 2 to 4 at a molecular weight of from 400 to 12,000, or mixtures of such polyether polyols with up to 10 wt-%, calculated on the weight of the polyether polyols, of 2- and/or 3-valent alcohols of a molecular weight of less than 400, are used as component b).

4. The process of claim 1 water is used as component c).

5. A Composite body prepared according to the process of claim 1.

* * * * *